July 11, 1961     J. WERNER     2,991,662

DEVICES FOR LIMITING ROTATION

Filed July 16, 1959

2,991,662
Patented July 11, 1961

2,991,662
DEVICES FOR LIMITING ROTATION
Johannes Werner, Offenbach (Main), Germany, assignor to Hans Traugott Golde & Co. G.m.b.H., a German body corporate, Hans Golde and Martin Löffler, all trading in partnership as Hans Traugott Golde G.m.b.H. & Co. K.G., Frankfurt am Main, Germany
Filed July 16, 1959, Ser. No. 827,482
Claims priority, application Germany Dec. 6, 1958
4 Claims. (Cl. 74—52)

This invention relates to a device for limiting rotation of a rotary member, for example the rotary driving device of a sliding roof of a vehicle.

It is often desirable to limit the number of revolutions turned through by such rotary driving devices to a figure corresponding to the maximum permissible movement of the sliding room. This prevents the drive from being overloaded when the sliding roof reaches an end position. It may also be desirable to limit the number of revolutions turned through by the drive of rigid sliding covers which are driven back below the fixed roof, and so to ensure that the rear edge of the sliding cover does not strike the roof frame with excessive force.

According to the present invention, there is provided a device for limiting rotation of a rotary member, comprising a first member turnable about a first axis for connection to said rotary member, a second member encircling said first axis, portions of the second member forming an inwardly facing surface which is generally cylindrical and which has its axis coincident with said first axis, a third member carried by said first member and being rotatable relative thereto about a second axis which is parallel to said first axis, an outwardly facing surface of said third member which is generally cylindrical and which has its axis coincident with said second axis and is in contact with said inwardly facing surface, the two contacting surfaces being formed for engagement such that the third member rolls upon said inwardly facing surface as the first member is turned, and arresting means for causing rotation of said third member to cease upon a predetermined angular displacement of said third member about the second axis.

The rotary member can take the form of a worm wheel for driving cables connected to a sliding roof of a motor vehicle.

Figure 1:
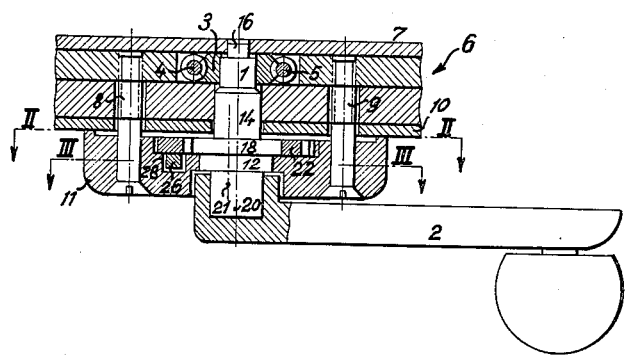
Figure 2:
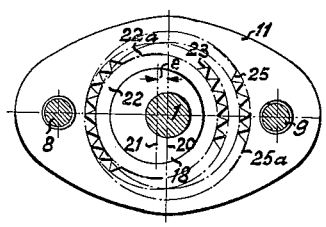
Figure 3:
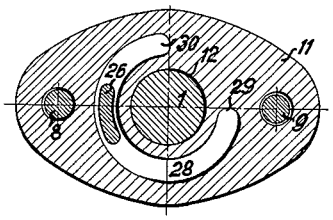

In order that the invention may be clearly understood and readily carried into effect, reference will now be made, by way of example, to the accompanying drawing, in which:

FIGURE 1 is a vertical section through part of a rotary driving device for a sliding roof of a motor vehicle, the driving device being fitted with a device for limiting the rotation thereof, FIGURE 2 is a sectional view taken along the line II—II in FIGURE 1, and FIGURE 3 is a sectional view taken along the line III—III in FIGURE 1.

Referring to the drawings, a drive spindle 1 has connected thereto, in a readily releasable or a non-releasable manner, a hand crank 2 by means of which the spindle can be turned about its axis 20. A worm wheel 3, serving as a drive wheel for displacement of the sliding roof, is rigidly secured to the spindle 1 and the drive is transmitted to the sliding roof through the agency of two cables 4 and 5 which have respective helical threads engaging with opposite sides of the worm wheel, thus move in opposite directions to one another as the wheel 3 rotates, and are attached to opposite sides of the sliding roof (not shown).

The wheel 3 is disposed in a drive box 6 including a cover 7 which is separable from the remainder of the drive box and is secured thereto by screws, for example. The drive box is secured by screws 8 and 9 to a suitable sheet metal part 10 of the vehicle body, the screws 8 and 9 extending through an anchor plate 11 and the box 6. The plate 11 encircles the axis 20 and provides a substantially cylindrical surface 25a having its axis coinciding with the axis 20. The spindle 1 is of differing diameters and has a bearing portion 12 thereof mounted in the anchor plate 11, a bearing portion 14 mounted in the main part of the drive box 6 and a bearing portion 16 mounted in the drive box cover 7.

An annular bearing flange 18 is provided to prevent axial movement of the spindle 1 and is fixed thereto with its axis 21 parallel to the axis 20 of the spindle. The distance e between the axes 20 and 21 is small and in the present case is about 1 mm. A ring 22 is carried by the spindle 1 in contact with the surface 25a for rolling on the latter, has its axis coinciding with the axis 21, and is rotatable about its own axis relative to the spindle. The outer periphery 22a of the ring 22 is provided with teeth while the surface 25a of the anchor plate 11 has teeth 25 co-operating with the teeth 23. In the present case the teeth 23 are one less in number than the teeth 25.

Projecting from the radial face of the ring 22 further from the wheel 3 is a fixed stop 26 movable, with radial clearance, in an arcuate groove 28 in the anchor plate 11.

The above-described arrangement operates as follows: When the hand crank 2, and therefore the spindle 1, are turned through 360° the worm wheel 3 rotates and moves the sliding roof (not shown) through a specific distance by way of the cables 4 and 5. The flange 18 simultaneously carries out one revolution, the teeth 23 rolling on the teeth 25. However, since the teeth 23 are one less than the teeth 25, the ring 22 is displaced through an angular distance corresponding to one tooth pitch for each revolution performed by the spindle 1. The stop 26 is thus also displaced through the same angular distance relative to the arcuate groove 28 in the anchor plate 11 and therefore moves towards either the end 29 or the end 30 of the groove, depending upon the direction of rotation of the hand crank 2.

When the step 26 abuts the relevant end of the groove 28, further rolling of the teeth 23 on the teeth 25 is prevented, with the result that the hand crank 2 cannot continue to be rotated in the same direction. All that can be done is for the hand crank 2 to be rotated in the opposite direction until the stop 26 abuts the other end of the groove 28 and thus the limit of rotation of the hand crank 2 in that opposite direction is reached.

It will be readily apparent that if the teeth 23 and 25, the distance e, and the lengths of the groove 28 and the stop 26 are suitably chosen, the revolutions which the spindle 1 performs until the stop 26 reaches one of its end positions can be set to the required number. Hence the number of revolutions carried out by the hand crank 2 would be so limited by the stop 26 that the wheel 3 displaces the cables 4 and 5, and therefore the sliding roof connected thereto, only over a specified distance.

The present rotation-limiting device has the advantage that it can be fitted into a conventional drive box without taking up any extra space not already occupied by the drive box, and that it can be fitted in a bearing of the drive spindle that it controls.

Instead of the stop 26 limiting rotation of the hand crank 2 by pressing against the relevant end of the groove 28, the stop 26 can be adapted to operate electrical contacts upon abutting the ends 29 and 30 of the groove, so that an electric drive for the spindle 1 is interrupted or another switching operation is initiated. Moreover, the teeth 23 and 25 could be replaced by surfaces of any suitable materials and having any suitable profiles, for example smooth cylindrical profiles, provided that there is adequate friction between the surfaces. This is possible because the forces to be transmitted are not very great, more particularly where the just-mentioned electric contacts are employed.

If, for instance, greater accuracy is required in the angular rotation of the spindle 1, the present rotation-limiting device could be provided with one or more additional stages. In such a case, the bearer of the groove 28 is separated from the anchor plate 11 and is rotatably mounted on the spindle, whereby it can be engaged by the stop 26 during rotation of the latter. This rotatable bearer of the groove 28 has a stop which corresponds to the stop 26 and which moves in another arcuate groove corresponding to the groove 28. It will be apparent that any desired number of stages can be connected up in series in this way.

I claim:

1. A device for limiting rotation of a rotary member, comprising a first member turnable about a first axis for connection to said rotary member, a second member encircling said first axis, portions of the second member forming an inwardly facing surface which is generally cylindrical and which has its axis coincident with said first axis, a third member carried by said first member and being rotatable relative thereto about a second axis which is parallel to said first axis, an outwardly facing surface of said third member which is generally cylindrical and which has its axis coincident with said second axis and is in contact with said inwardly facing surface, the two contacting surfaces being formed for engagement so that the third member rolls upon said inwardly facing surface as the first member is turned, and arresting means comprising a stop member formed in one of said second and third members and an arcuate recess in the other of said second and third members, said recess being adapted to accommodate said stop member for limited angular movement therein, so as to cause rotation of said third member to cease upon a predetermined angular displacement of said third member about the second axis.

2. A device for limiting rotation of a rotary member, comprising a spindle mounted for rotation about its axis, for connection to the rotary member, a circular flange mounted fast on the spindle and having its axis parallel to that of the spindle, a ring-like member mounted on the flange for rotation with respect thereto about the axis of the flange, an encircling member encircling the ring-like member, portions of said encircling member forming an inwardly facing surface which is generally cylindrical and which has its axis coincident with the spindle axis, portions of said ring-like member forming an outwardly facing surface which is generally cylindrical and has its axis coincident with the axis of the ring-like member and which is in contact with said inwardly facing surface, the two contacting surfaces being formed for engagement so that the ring-like member rolls upon said inwardly facing surface as the spindle is turned, portions of said encircling member defining an arcuate groove co-axial with said spindle axis, and arresting means consisting of the ends of said groove and of a stop carried by said ring-like member and projecting with radial clearance into said groove, said arresting means being adapted to stop the rotation of said rotary member upon a predetermined angular displacement of said ring-like member about the axis of said flange.

3. A drive mechanism for moving a device such as a sliding roof between two positional locations, comprising, a rotary crank shaft rotatable in each direction for transmitting movement to the roof, an eccentric member fixed to said crank shaft for rotation therewith, a ring member mounted on the periphery of said eccentric for rotation therearound, a stationary member in driving engagement with the outer periphery of said ring to rotate said ring relative to said eccentric when said crank shaft and said eccentric are rotated, and arresting means comprising a first portion on said ring and a second portion on said stationary member operatively engaging said first portion, said arresting means being located in the rotative path of movement of said ring in each direction arranged to arrest said ring and to prevent its rotation relative to said eccentric whereby to stop said shaft and said eccentric due to the holding engagement of the periphery of said ring by said stationary member.

4. A drive mechanism for a sliding roof and the like comprising a rotary crank shaft rotatable in each direction between predetermined limits, an eccentric member affixed to said crank shaft for rotation therewith, a ring member mounted on the periphery of said eccentric member for rotation therearound and including external gear teeth extending around the periphery thereof, said ring including an outstanding members, a stationary member having internal gear teeth in driving engagement with gear teeth of said ring whereby to rotate said ring relative to said eccentric when said eccentric and said shaft are rotated, and means to limit rotation of said shaft including fixed stop means in the path of movement of said ring outstanding member located to engage said outstanding member to stop the relative rotation of said ring with respect to said eccentric after a predetermined relative rotation thereof whereby to stop rotation of said shaft due to the holding engagament of the periphery of said ring by said stationary member gear teeth.

References Cited in the file of this patent

UNITED STATES PATENTS

| 2,151,534 | Scofield | Mar. 21, 1939 |
| 2,823,561 | Opocensky | Feb. 18, 1958 |
| 2,844,038 | Danta | July 22, 1958 |
| 2,903,893 | Scott et al. | Sept. 15, 1959 |